United States Patent [19]

Nakase et al.

[11] Patent Number: 4,990,836

[45] Date of Patent: Feb. 5, 1991

[54] MOTORIZED AUTOMOBILE ANTENNA CONTROL DEVICE

[75] Inventors: Kazuhiko Nakase; Kazufumi Sato, both of Tokyo, Japan

[73] Assignee: Harada Kogyo Kabushiki Kaisha, Tokyo, Japan

[21] Appl. No.: 281,177

[22] Filed: Dec. 7, 1988

[30] Foreign Application Priority Data

Dec. 8, 1987 [JP] Japan ............................... 62-310079

[51] Int. Cl.[5] ............................................ H02P 1/22

[52] U.S. Cl. .................................... 318/285; 318/266; 318/466

[58] Field of Search ............... 318/255, 256, 264, 265, 318/266, 280, 283, 284, 285, 286, 434, 445, 452, 466, 467, 468, 469; 343/715, 903

[56] References Cited

U.S. PATENT DOCUMENTS 4,672,278 6/1987 Ingraham et al. .............. 318/266 X
4,749,924 6/1988 Watanabe et al. .................. 318/474

FOREIGN PATENT DOCUMENTS 2239803 2/1975 France ................................ 318/286

*Primary Examiner*—Bentsu Ro
*Attorney, Agent, or Firm*—Koda & Androlia

[57] ABSTRACT

In a motorized automobile antenna control device for an antenna system wherein an antenna is raised when power supply of a radio receiver is switched on and lowered when the power supply is switched off, the antenna is prevented from being lowered for a predetermined period of time, for example two to ten seconds, after the power supply of the radio receiver is turned off by a timer so that unnecessary raising and lowering motions of the antenna are prevented when an ignition switch of an automobile is turned on.

3 Claims, 3 Drawing Sheets

MOTORIZED AUTOMOBILE ANTENNA CONTROL DEVICE

BACKGROUND OF THE INVENTION

1. Field of the Invention

The present invention relates to a motorized automobile antenna control device which raises an automobile antenna when the power supply of radio receiver is switched "on" and lowers the antenna when the power supply is switched "off".

2. Prior Art

In conventional motorized automobile antenna control devices, while an engine starter is being started the accessory power supply (ACC) is switched "off" so that the load on the battery can be reduced. Accordingly, during this period of time, the radio power supply (RX) is switched "off". As a result, such conventional devices involve the following drawback: i.e., when the engine starter is started, the motorized automobile antenna is automatically lowered. Furthermore, when the engine starter is returned to its original position, the radio power supply is switched "on" so that the antenna is again raised.

In other words, the conventional systems' drawback is that when the engine is started with the motorized antenna in an extended or raised state (e.g., in cases where the engine has unexpectedly stopped, etc.), the antenna undergoes an unnecessary lowering and raising action instead of remaining stationary as would be perfectly accepted. Furthermore, a similar situation can occur in cases where the automobile is started again after listening to the radio with the engine stopped.

Conventionally, the abovementioned drawback has been overcome by using logical operations based upon the ignition (IG) voltage and accessory voltage to determine whether or not the starter is being started and by stopping the operation of the antenna motor while the starter is being started.

In conventional devices, since logical operations are used in order to determine whether or not the starter is being started, three control lines which respectively detect the states of the radio power supply, ignition power supply and accessory power supply are required. Furthermore, the control circuit which determines such logical operations is complicated.

SUMMARY OF THE INVENTION

Accordingly, it is a primary object of the present invention to provide a motorized automobile antenna control device wherein the lowering of the antenna is prevented for a predetermined period of time after the power supply of a radio receiver is turned off.

It is another object of the present invention to provide a motorized automobile antenna wherein there is no need to provide two control lines which respectively detect the states of the ignition power supply and the accessory power supply, and also there is no need for a control circuit to determine the logical operations.

The abovementioned objects of the present invention are achieved by a unique structure of a motorized automobile antenna control device including an antenna raising trigger circuit and an antenna lowering trigger circuit which are connected to a power supply of a radio receiver. A timer is provided between the power supply and the antenna lowering trigger circuit and outputs a signal for certain predetermined period of time, such as three seconds, for raising the antenna after the power supply for the radio receiver is turned off and the antenna lowering trigger circuit generates a trigger when the signal from the timer is dropped. A motor polarity switching circuit is connected to the antenna raising trigger circuit and drives an antenna motor so that it raises the antenna when the antenna raising trigger circuit generates a trigger. Also, a motor power supply switching control circuit is connected to the motor antenna and to the antenna lowering trigger circuit and drives the antenna motor when the antenna raising trigger circuit or the antenna lowering trigger circuit generates a trigger.

DETAILED DESCRIPTION OF THE INVENTION

Figure 1:
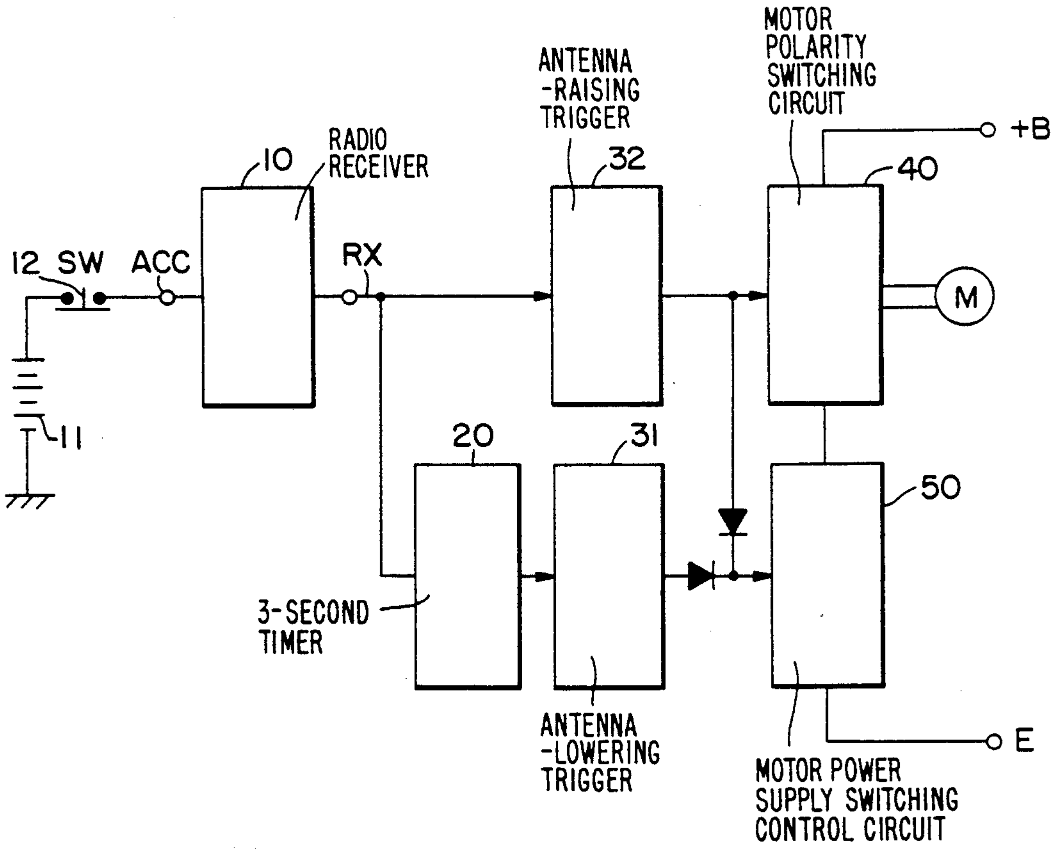
FIG. 1 is a circuit diagram of one embodiment of the present invention.

FIG. 1 is a circuit diagram illustrating one embodiment of the present invention.

In this embodiment, a switch 12 which acts in conjunction with an ignition key is connected to battery 11. A output terminal of this switch 12 is an ACC (accessory) terminal. A radio receiver 10 is connected to this ACC terminal, and the radio power supply RX goes to high (H) when the radio switch is switched "on" and to low (L) when the radio switch is switched "off".

A 3-second timer 20 and an antenna-raising trigger circuit 32 are connected to the radio power supply RX, and an antenna-lowering trigger circuit 31 is connected to the 3-second timer 20.

The 3-second timer 20 may be a resettable multivibrator, etc. This timer 20 outputs an H signal when the radio power supply RX is in an H state and continues outputting the H signal for only three seconds after the switching of the radio power supply RX to an L state is made. The antenna-lowering trigger circuit 31 generates a trigger when the output signal of the 3-second timer 20 drops. The antenna-raising trigger circuit 32 generates a trigger when the signal of the radio power supply RX rises.

A motor polarity switching circuit 40 switches the polarity of automobile antenna motor M so that the motor raises an motorized automobile antenna when the antenna-raising trigger circuit 32 generates a trigger. At all other times, this circuit 40 switches the polarity of the motor M so that the motor lowers the antenna.

Further, a motor power supply switching control circuit 50 is connected in series to the automobile antenna motor M. This circuit 50 powers the motor M when the antenna-raising trigger circuit 32 or antenna-lowering trigger circuit 31 generates a trigger. Also, the motor power supply switching control circuit 50 detects an excessive current of the motor M when the motorized antenna is at its highest point or the lowest point and cuts off the power to the motor M.

The 3-second timer 20 is described only as an example of a means for preventing the motorized automobile antenna from lowering for only a predetermined period of time, in this case for three seconds, after the radio power supply is turned off.

Figure 2:
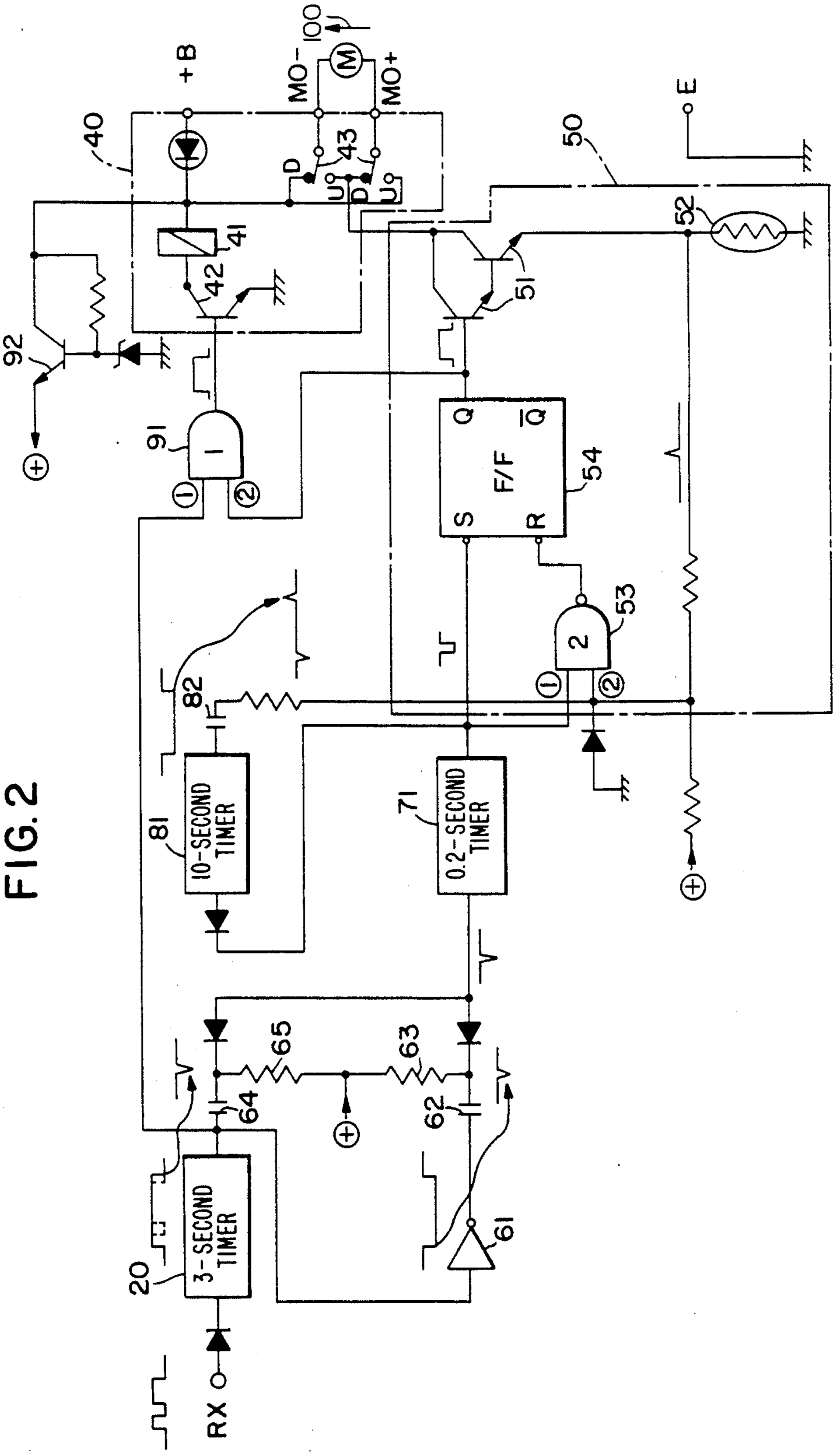
FIG. 2 is a circuit diagram of the abovementioned embodiment illustrated in a more concrete manner.

FIG. 2 is a circuit diagram illustrating the abovementioned embodiment in a more concrete manner.

The motor polarity switching circuit 40 includes a relay 41, a transistor 42 (e.g., a 2SC2458 transistor) which is connected in series with relay 41 and contacts 43 for the relay 41. Contacts 43 consist of two contacts. When these contacts are connected to terminals U and U, the motor M turns in the forward direction and raises the motorized automobile antenna. When the contacts are connected to the terminals D and D, the motor turns in the reverse direction and lowers the motorized automobile antenna.

The motor power supply switching control circuit 50 has a driving transistor 51 (e.g., a 2SD686 transistor) which is connected in series to the motor M. The motor power supply switching control circuit 50 further includes a positive-characteristic temperature-resistance element 52 which is connected to the emitter of the transistor 51, a NAND gate 53 and an RS flip-flop 54. The flip-flop 54 is set at the rise or drop of the 3-second timer 20 and is reset when the NAND gate 53 generates a negative pulse.

The terminal voltage of an element 52 becomes high in response to the current flowing to the motor M. When the antenna has reached its highest or lowest point, an electric current above a predetermined level flows to the motor M so that the terminal voltage becomes extremely high. The NAND gate 53 generates a reset pulse which resets the flip-flop 54 when the motor current has exceeded the predetermined level.

Furthermore, the rise of the output signal of the 3-second timer 20, i.e., the rise of the radio power supply RX, is detected by an inverter 61 which inverts the output signal of the 3-second timer 20, a capacitor 62 and a resistor 63, while the drop of the output signal of the 3-second timer 20, i.e., the drop of the radio power supply RX, is detected by a capacitor 64 and a resistor 65.

A 0.2-second timer 71 generates a negative pulse for 0.2 seconds when the output signal of the 3-second timer 20 rises or drops. This 0.2-second negative pulse sets the above-mentioned flip-flop 54 and prevents the flip-flop 54 from being reset by a current spike created by the motor M.

A 10-second timer 81 generates a negative pulse for ten seconds after the rise or drop of the output signal of the 3-second timer 20. The capacitor 82 generates a positive pulse when the output signal of the 10-second timer 81 rises. This positive pulse forcibly resets the flip-flop 54 via the NAND gate 53 and thus cuts off the power to the motor M even in the case of abnormal operation in which the element 52 does not generate the predetermined voltage when the motor M is locked.

In addition, an AND gate 91 and a regulating power supply transistor 92 (e.g., a 2SC2458 transistor) are installed. The AND gate 91 switches the transistor 42 "on" while the 3-second timer 20 is outputting the H signal and the flip-flop 54 is set. This excites the relay 41 so that the contacts 43 are connected to the terminals U and U.

Hereunder, the operation of the abovementioned embodiment will be described.

Figure 3:
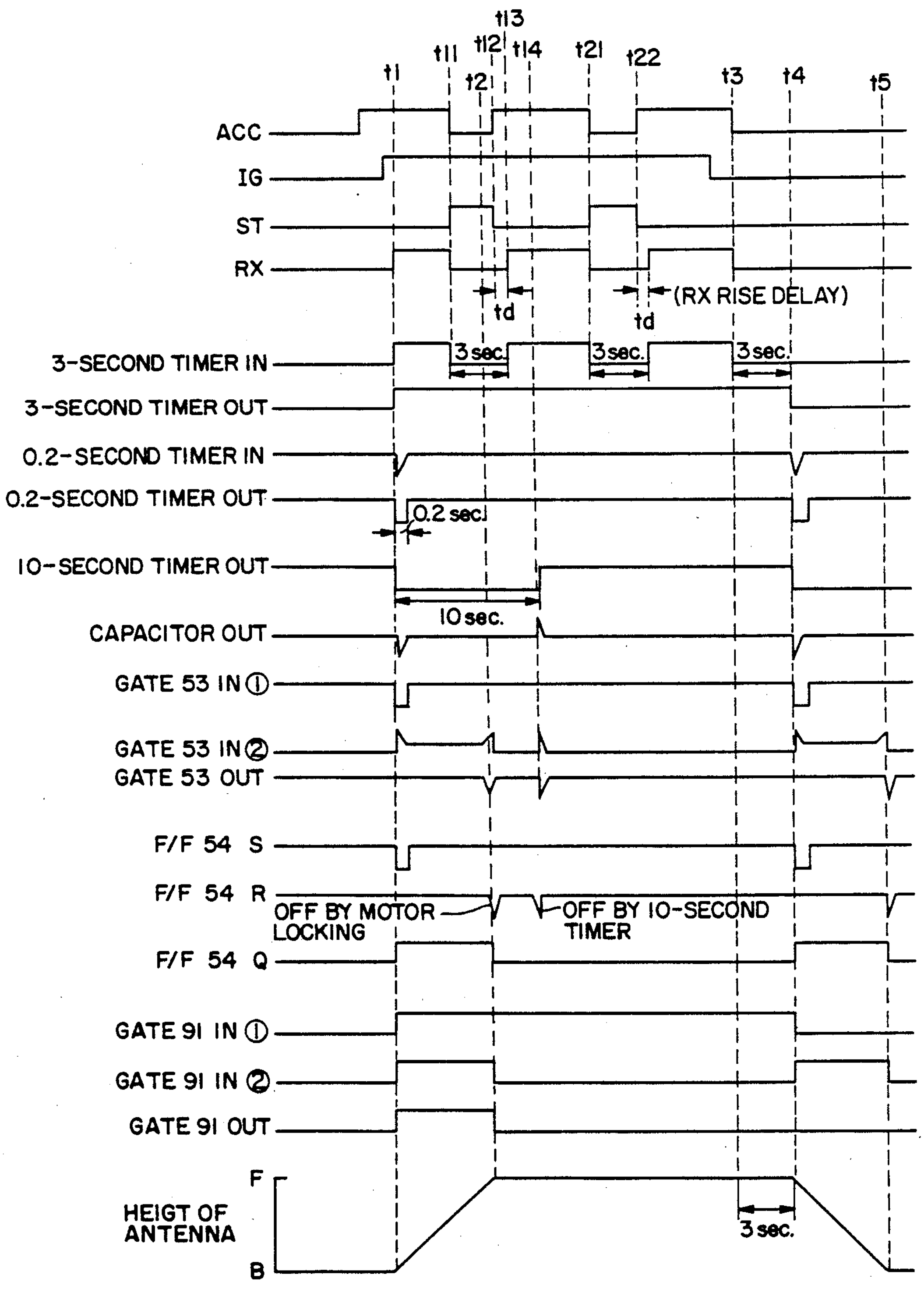
FIG. 3 is a time chart of the operation of the abovementioned embodiment.

FIG. 3 is a time chart which illustrates the operation of the embodiment.

First, an automobile key is turned so that the ACC is switched "on" and the IG is switched "on". At $t_1$, the radio power supply RX is switched "on". As a result, the output terminal of the 3-second timer 20 goes to H, and the output signal of the 3-second timer becomes H. Hence, the output signal of the inverter 61 drops, and a negative pulse is generated by a differentiation circuit comprising a capacitor 62 and a resistor 63. Accordingly, the 0.2-second timer 71 generates a negative pulse for 0.2 seconds. Furthermore, the 10-second timer 81 outputs a negative signal, and since the 0.2-second timer 71 generates a negative pulse, the flip-flop 54 is set at the abovementioned $t_1$. Also, since the flip-flop 54 is set, the transistor 51 is switched "on", and the motor M is powered.

In this case, since a Q output of the flip-flop 54 is H and the output signal of the 3-second timer 20 is H, the output signal of the AND gate 91 is H. As a result, the transistor 42 is switched "on", the relay 41 is excited and the contacts 43 are connected to the terminals U and U. Accordingly, the automobile antenna motor M turns in the direction which raises the motorized antenna, i.e., in the direction indicated by an arrow 100 in FIG. 2.

In this case, since the 0.2-second timer 71 generates a negative pulse for 0.2 seconds, the NAND gate 53 does not output a negative pulse during this period, even if a rush current should flow immediately after the motor M begins to turn, so that the terminal voltage of the element 52 is momentarily high. Accordingly, there will be no resetting of the flip-flop 54 or stopping of the motor M. Then, after the abovementioned 0.2-second time period has elapsed, the terminal voltage of the element 52 will not reach the predetermined level, because the current of the motor M will be small at this time. Accordingly, the input 2 of the gate 53 will not be H, and the flip-flop 54 will not be reset for some time. Thus, the antenna is gradually raised.

Then, when the motorized antenna reaches its highest point at $t_2$, the motor M is locked, the motor current becomes large and the terminal voltage of the element 52 exceeds the predetermined level. As a result, the input 2 of the NAND gate 53 becomes H. Since the input 1 of the NAND gate 53 is also H at this time, the NAND gate 53 generates a negative pulse, so that the flip-flop 54 is reset.

As a result, the transistor 51 is switched "off", and the current to the motor M is cut off. At this time, the Q output of the flip-flop 54 becomes L, and the transistor 42 is switched "off". Accordingly, the relay 41 is no longer excited, and the contacts 43 are connected with the terminals D and D.

Then, when the radio power supply RX is switched "off" at $t_3$, the output signal of the 3-second timer 20 becomes L three seconds later at $t_4$. The drop of this signal is detected by a differentiation circuit comprising a capacitor 64 and a resistor 65, and the 0.2-second timer 71 generates a negative pulse for 0.2 seconds so that the flip-flop 54 is set. As a result, the transistor 51 is switched "on", and a current flows to the motor M. Since the contacts 43 are connected to the terminals D and D at this time, current flows to the motor M in the direction opposite to that described above so that the motorized antenna is lowered.

Then, at $t_5$, the abovementioned motorized antenna reaches its lowest point. As a result, the motor M is locked, the motor current increases, and the terminal voltage of the element 52 exceeds the predetermined level. Accordingly, the gate 53 generates a negative pulse, and the flip-flop 54 is reset. The transistor 51 is, therefore, switched "off" so that the motor current is cut off.

In this way, the motorized antenna can be repeatedly raised and lowered.

Meanwhile, if the starter ST is turned on at $t_{11}$ while the motorized antenna is being raised, the radio power supply RX is switched "off", and the input voltage of the 3-second timer 20 is L. In this case, since engines ordinarily start within three seconds, the time during which the starter ST is being turned on is also ordinarily three seconds or less. If the time at which the starter ST is returned to its original position in three seconds or less is to be $t_{12}$, then $t_{13}$, which is later than this $t_{12}$ by the rise delay time $t_d$ of the radio power supply RX, will also ordinarily be less than three seconds later than the abovementioned point in time $t_{11}$. Accordingly, the output signal of the 3-second timer 20 is maintained at H even at $t_{13}$. Thus, since the output signal of the 3-second timer 20 does not drop, the output of the gate 91 is H, the transistor 42 is "on", and the motor M continues its forward rotation.

In other words, even if the starter is turned for a short time while the antenna is being raised, the output of the 3-second timer 20 is maintained at H, the output of the gate 91 does not become L, and the transistor 42 is not switched "off". Accordingly, there is no reverse turning of the motor M, and no abnormal state is created in which the antenna is unnecessarily lowered.

Then, at $t_{14}$ after a time period of ten seconds has elapsed from $t_1$, the 10-second timer 81 rises, and a positive pulse is generated at the output terminal of the capacitor 82. As a result, the flip-flop 54 is forcibly reset after ten seconds. Accordingly, although motorized antennas ordinarily reach at its highest point within ten seconds, the flip-flop 54 will be forcibly reset by the output signal of the 10-second timer 81 so that the power to the motor M is cut off, even if current should continue to flow to the motor M after a period of ten seconds has elapsed due to some abnormality of the element 52, etc. Thus, the system of the present invention is very safe.

Furthermore, even if the starter ST should be turned for a short period of time at $t_{21}$ when the motorized antenna is at its highest point, the output signal of the 3-second timer 20 will be maintained at H as long as the total time elapsed from $t_{21}$ is less than three seconds when the rise delay time $t_d$ of the radio power supply RX has passed following the completion of the turning of the starter at $t_{22}$. Accordingly, as in the case described above, the motor M will not be powered, and the motorized antenna will not be abnormally operated.

In the above embodiment, the timer 20 is set for three seconds. However, this time period is not limited to three seconds, and a timer time of two to ten seconds may be used. Furthermore, means other than a resettable multivibrator may be used instead of the 3-second timer 20 as long as such means is capable of preventing the lowering of the antenna for a specified period of time after the switching "off" of the power supply of the radio receiver. Furthermore, the timer times other than 0.2 seconds and ten seconds may be set in the timers 71 and 81, respectively.

As described in the above, according to the present invention, the control device does not require two control lines which are used as signal lines for controlling the motorized automobile antenna and each detects the status of the ignition and accessory power supplies. Also, the control device does not require a control circuit for determining logical operation but is simple in construction and prevents any abnormal operations which might be caused by a starter being turned on.

I claim:

1. A motorized automobile antenna control device for controlling a motorized automobile antenna comprising:

a means for causing said motorized automobile antenna to be raised when a power supply of a radio receiver is switched on;

a means for causing said motorized automobile antenna to be lowered when said power supply is switched off; and a means for preventing said means for causing said motorized automobile antenna to be lowered from operating for a predetermined period of time of two to ten seconds after said power supply is switched off;

whereby lowering of said motorized automobile antenna is prevented for said predetermined period of time after said power supply of said radio receiver is switched off to thereby prevent abnormal operation of said motorized automobile antenna caused by a starter of said motor vehicle being turned on.

2. A motorized automobile antenna control device of the type wherein a motorized automobile antenna is raised when a power supply of a radio receiver is switched on and lowered when said power supply is switched off, said device comprising:

a trigger pulse generator circuit means coupled to said power supply for said radio receiver for causing said motorized automobile antenna to be raised when said power supply of said radio receiver is switched on and for causing said motorized automobile antenna to be lowered when said power supply of said radio receiver is switched off; and a timer coupled between said trigger pulse generating circuit means and said power supply of said radio receiver for preventing operation of said trigger pulse generating circuit means or a predetermined period of time of two to ten seconds only when said power supply of said radio receiver is switched off;

whereby said motorized automobile antenna is prevented from being lowered for said predetermined period of time after said power supply of said radio receiver is switched off to thereby prevent abnormal operation of said motorized automobile antenna caused by a starter of said motor vehicle being turned on.

3. A motorized automobile antenna control device according to claim 2, wherein said timer comprises a resettable multivibrator.

* * * * *